(12) United States Patent
Walter et al.

(10) Patent No.: US 12,119,471 B2
(45) Date of Patent: Oct. 15, 2024

(54) TEMPERATURE CONTROL SYSTEM FOR LITHIUM ION BATTERY CELLS

(71) Applicant: Oerlikon Friction Systems (Germany) GMBH, Bremen (DE)

(72) Inventors: Heribert Walter, Bamberg (DE); Michael Maag, Herrieden (DE); Tobias Fritz, Seukendorf (DE); Markus Gradler, Erlangen (DE); Jessica Uhlemann, Bubenreuth (DE); Thomas Ubler, Nuremberg (DE)

(73) Assignee: Oerlikon Friction Systems (Germany) GMBH, Bremen (DE)

( * ) Notice: Subject to any disclaimer, the term of this patent is extended or adjusted under 35 U.S.C. 154(b) by 492 days.

(21) Appl. No.: 17/605,607

(22) PCT Filed: Apr. 29, 2020

(86) PCT No.: PCT/EP2020/061913
§ 371 (c)(1),
(2) Date: Oct. 22, 2021

(87) PCT Pub. No.: WO2020/221806
PCT Pub. Date: Nov. 5, 2020

(65) Prior Publication Data
US 2022/0209330 A1    Jun. 30, 2022

(30) Foreign Application Priority Data

May 2, 2019 (DE) .......................... 102019111354.7
May 2, 2019 (DE) .......................... 102019111355.5
Feb. 28, 2020 (DE) .......................... 102020105308.8

(51) Int. Cl.
*H01M 10/6556* (2014.01)
*H01M 10/0525* (2010.01)
(Continued)

(52) U.S. Cl.
CPC ..... *H01M 10/6556* (2015.04); *H01M 10/652* (2015.04); *H01M 10/653* (2015.04);
(Continued)

(58) Field of Classification Search
CPC .......... H01M 10/6556; H01M 10/652; H01M 10/653; H01M 10/6551; H01M 10/667;
(Continued)

(56) References Cited

U.S. PATENT DOCUMENTS

| 8,465,864 B1 | 6/2013 | Kwak et al. |
| 2013/0071720 A1 | 3/2013 | Zahn |
| 2020/0006820 A1 | 1/2020 | Cha |

FOREIGN PATENT DOCUMENTS

| CN | 107408718 A | 11/2017 |
| CN | 207233906 U | 4/2018 |

(Continued)

OTHER PUBLICATIONS

Notification on sending International Preliminary Report on patentability, "Mitteilung Uber Die Ubersendung Des Internationalen Vorlaufigen Berichts Zur Patentierbarkeit", International Application PCT/EP2020/061913 filed Apr. 29, 2020.
(Continued)

*Primary Examiner* — Helen Oi K Conley
(74) *Attorney, Agent, or Firm* — Hinckley, Allen & Snyder; Stephen Holmes

(57) ABSTRACT

The present invention relates to a temperature control system for effective cooling and heating of rechargeable battery cells, in particular lithium (Li) ion batteries, wherein the temperature control module comprises an outer shell (1) made of a polymer material, which surrounds at least one heat-conducting layer made of unidirectional carbon fibre composite (2) and has, on each of two opposing edge regions of the main surfaces thereof, a conduit (3) for conveying a
(Continued)

Figure 1:
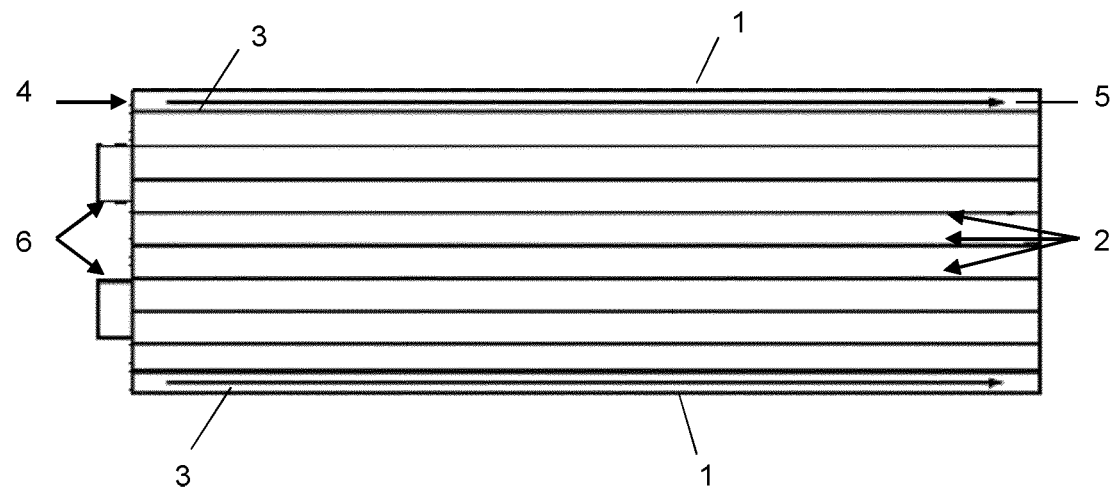

heat transfer medium, the conduits (3) extending along the edge regions from one end to the other; at least two layers of unidirectional carbon fibre composite (2) arranged one above the other are preferably provided, and an intermediate layer (7) having throughflow channels (8) which connect the conduits (3) to one another is located between the layers.

15 Claims, 5 Drawing Sheets

(51) Int. Cl.
*H01M 10/652* (2014.01)
*H01M 10/653* (2014.01)
*H01M 10/6551* (2014.01)
*H01M 10/667* (2014.01)

(52) U.S. Cl.
CPC ..... *H01M 10/6551* (2015.04); *H01M 10/667* (2015.04); *H01M 10/0525* (2013.01)

(58) Field of Classification Search
CPC ......... H01M 10/0525; H01M 2220/20; H01M 10/647; H01M 10/6555; H01M 10/6557; H01M 10/6568; H01M 10/643; H01M 10/625; H01M 10/613; H01M 10/615; Y02E 60/10

See application file for complete search history.

(56) References Cited

FOREIGN PATENT DOCUMENTS

| | | |
|---|---|---|
| DE | 102009052254 A1 | 5/2011 |
| DE | 102017111130 A1 | 11/2017 |
| DE | 102020105308 A1 | 11/2020 |
| EP | 2744034 A1 | 12/2012 |
| JP | 2010245400 A | 10/2010 |
| JP | 2018206605 A | 12/2018 |
| WO | 2016138463 A1 | 1/2016 |

OTHER PUBLICATIONS

International investigation report and Decision of International Agency, "Mitteilung Uber Die Ubermittlung Des Internationalen Recherchenberichts Und Des Schriftlichen Bescheids Der Internationalen Recherchenbehorde Oder Der Erklarung", International Application PCT/EP2020/061913 filed Apr. 29, 2020.
CNIPO, Notice of First Office Action, Dated Jul. 31, 2024 (english translation).

TEMPERATURE CONTROL SYSTEM FOR LITHIUM ION BATTERY CELLS

The present invention relates to an effective temperature control system for the cooling and heating of rechargeable battery cells, in particular rechargeable lithium (Li) ion batteries (LIBs).

LIBs have a high energy density for a relatively small weight and space requirement. Therefore, they are already utilized in numerous fields of application for effective energy storage. An especially prominent example of their application is electromobility, such as, for example, as an energy source in electric vehicles or so-called hybrid vehicles.

Typically, for the operation, a number of battery cells are combined to form a battery module and two or more battery modules are combined to form a battery pack. The cells and/or modules can be connected in parallel and/or in series There exist battery cells in various sizes and shapes, such as cylindrical cells, for example, or flat cells, such as prismatic cells or pouch cells (coffee bag cells). Used in the case of pouch cells is a flexible housing, which, as a rule, is composed of aluminum foil that is coated with plastic on both sides. A typical pouch cell dimension is 350 mm×100 mm.

Flat cells, such as pouch cells or prismatic cells, are preferred with respect to a better heat dissipation and stackability.

A typical construction of a LIB is as follows, beginning from the anode side:
  an anode with a current collector (as a rule, copper), which, at least on the side facing the cathode, is coated with an active material (as a rule, graphite),
  a separator for the electronic separation of the electrodes, which, however, is permeable for Li ions, and
  a cathode with a current collector (as a rule, aluminum), which, at least on the anode side, is coated with an active material, which, during the charging of the cell, releases Li ions, and
  an electrolyte (as a rule, liquid or solid), which acts as a mediator between the reactions at the electrodes and ensures the transport of Li ions.

Suitable materials for active materials for the cathode and the anode, the separator, and the electrolyte are prior art.

Of central importance for the operability and safety of LIBs—but also for all other types of rechargeable batteries—is the maintenance of a stipulated temperature range. The thermal management of rechargeable battery cells is a key criterion for being able to ensure normal operation with optimal power output and lifetime.

In general, it is important to operate lithium ion battery cells in a defined temperature range between 15 and 35° C. in order to prevent premature aging of the battery cells and ensure a high cycling stability. Only when the battery system is consistently operated in the ideal temperature range is it possible to achieve the charging cycles of up to 1600 full cycles over 10 years required in the industry. Thus, battery systems that, in relation to their state on delivery (begin of life, BoL), have lost 20% of their storage capacity and consequently, when fully charged, still have only at most 80% of their original cell capacity (state of health, SoH) can no longer be utilized for automotive purposes (end of life, EoL).

In every season, in summer as well as in winter, it must be possible by way of a corresponding temperature control of the battery cells to ensure that the cells can be operated in a constant temperature window of between 15 and 35° C., with the optimal operating temperature being 25° C. If the battery is operated continuously at 40° C., for example, the aging will be accelerated by up to 50%.

It needs to be taken into consideration that the thermal behavior of a battery cell is strongly anisotropic. Perpendicular to the cell surface, the low thermal conductivity of the separator of approximately 1 W/mK in the case of polyethylene films governs the thermal conductivity of the cell stack or of the coiled cell roll in the case of cylindrical cells. In the plane in the case of pouch and prismatic cells or in the height in the case of cylindrical cells, the thermal conductivity is governed by the metallic current collector, which lies at approximately 30 W/mK.

A further problem is caused by the desire of the driver of an electric automobile to keep the charging cycles in a charging station as short as possible. Already in the near future, there will be charging systems with 800 V supply voltage, by means of which high charging rates (C-rates) of up to 3 to 5 C can be realized. Such high C-rates lead to an increase in the line current density around the contact region of the electrodes and ultimately to a drastic heating of the entire cell.

Temperatures above 80° C. need to be avoided in any case, because, in this range, the electrolyte layer around the graphite particles of the anode is degraded.

In general, even temperatures above 60° C. should be avoided. At this point, it needs to be taken into consideration that, in warm regions, the ambient temperature and the radiation of heat from the road can already lead to such a high heating.

A further important aspect for an accelerated cell aging is, besides the absolute operating temperature, the temperature homogeneity over the cell surface and cell thickness.

As viewed over the cell surface, there is a temperature gradient, with the temperature being highest in the region of the electrode contacts. This different heat distribution leads to mechanical stresses within the cell, which can shorten its lifetime.

High charging currents and discharging currents, such as those envisaged nowadays, produce an increased line current density in the region of the electrode terminal contacts, which, in these regions, leads to an increased heating. Ultimately, as a result of this, mechanical stress is created in the anode and cathode coating, which, on the one hand, can directly damage the anode particles in particular and, on the other hand, can lead to a loss of electrical contact of the particles among one another on account of expansion and shrinkage and, ultimately, also to the detachment of the coating from the current collector films and hence, in association therewith, to the loss of the electrical contact of the coating to the current collector.

It is therefore necessary to dissipate heat from the electrode contact regions and to ensure a greatest possible uniform heat distribution over the cell surface and cell thickness.

In addition, in the thermal management of battery systems, the vehicle operation at low temperatures needs to be taken into consideration. At low temperatures, in particular below 0° C., the cell voltage declines drastically. Since, for normal driving operation, the cell voltage is no longer sufficient even at temperatures below 10° C., the range of the vehicle is strongly restricted.

The operating voltage of a LIB typically lies in a range of between 2.7 V and 4.2 V. On account of the increasing viscosity of the electrolyte at decreasing temperatures, its ion conductivity and hence, in association therewith, the cell voltage decline. At approximately 2.7 V, the lower cut-off voltage of the cell is reached and hence, for reasons of safety, no further operation of the cell is possible.

Besides the reduction in the cell capacity, the charging of the battery cell can additionally lead at low temperatures to so-called Li plating of the anode. The Li plating is based on the fact that both the cathode and the anode have the physical ability to bind lithium ions. During charging, the electric field forces the ions to migrate from the cathode to the anode, where they are incorporated (intercalated) into the lattice structure of the active material, such as, for example, graphite.

Particularly at low temperatures, it transpires that the Li ions—instead of being intercalated in the anode as desired—form metallic lithium, which is deposited on the anode and hence is no longer available for the charging process. This loss of cyclable lithium ions diminishes the performance of the battery and, in the worst case, can lead to a so-called "thermal runaway" with fire and explosion of the cells.

It ensues from the preceding discussions that, for an optimal thermal management of a battery system, in addition to the cooling function at high temperatures and/or at high charging rates, also a heating of the cells at low temperatures is required. To be desired, therefore, is a temperature control module that can efficiently make possible both functions, namely, the cooling as well as the heating. For this purpose, the temperature control module should have a thermal contact to the surface of the battery cell that is as good as possible.

A suitable temperature control module should therefore have the following characteristics:
- it should be as slim and light as possible in its construction;
- it should be mechanically self-supporting, but allow a certain flexibility in terms of twisting and bending;
- it has to be possible to circulate a liquid or gaseous heat transfer medium through it for temperature control;
- preferably, the module should be able to compensate for temperature inhomogeneities (a temperature gradient) over the battery cell surface;
- it should have an elastically deformable surface layer for better coupling to uneven surfaces and for uniform distribution of the pressure load on the anode layers of a battery stack;
- it should have a certain mechanical flexibility in order to be able to adapt to potential dimensional changes of the cell during charging/discharging, as is especially the case for pouch cells;
- it should be possible to cool or heat directly the cell contacts of a battery cell.

The object is achieved by the temperature control module according to the invention for the cooling or heating of battery cells, wherein the temperature control module comprises an outer shell made of a polymeric material and the outer shell comprises two opposing main surfaces, which are joined to each other at their edges, and, on each of two opposing edge regions of the main surfaces, a conduit for conveying a heat transfer fluid is provided, the conduits extending along the edges, wherein, in the interior of the module, at least one heat-conducting layer made of unidirectional carbon fiber composite is provided, which extends between the conduits over the module surface.

The thickness of the temperature control module should be as small as possible so as not to increase unnecessarily the space requirement of a battery system furnished with a temperature control module or temperature control modules. Desired, therefore, are flat temperature control modules, the thickness of which is small in relation to the other dimensions, such as length, width, and diameter.

The shape of the temperature control module is governed by the shape of the battery cell for which it is to be used. For flat battery cells, a rectangular basic shape is appropriate. However, other shapes are also possible, such as those that are square, circular, etc.

The outer shell surrounds the inner-lying components of the module. It has two opposing main surfaces, which are joined to each other along their edges. The joining can occur via lateral surfaces.

The outer shell with its edge region is made of an at least partially flexible polymeric material, such as a silicone elastomer or a polyurethane elastomer. Preferably, the partially flexible polymeric materials have a Shore hardness A of A 20 to A 60 or a Shore hardness 00 of 00 20 to 00 80.

For example, for battery cells or battery cell stacks with structured uneven surfaces, it is possible to use softer polymeric materials for the outer shell, which are able to adapt more readily to the surface structures of the batteries, so that a good contact between the temperature control module and the surface of the battery cell can be ensured. A good contact between the temperature control module and the battery cell is desirable for a heat transfer that is as efficient as possible.

In addition to the compensation of surface unevenness of the battery cells, the outer shell effects a homogeneous transfer of pressure onto the cell. For example, pressures of 0.1 to 0.5 MPa can be safely and securely transferred and a complete recovery when the pressure is released can be ensured. The outer shell can thereby counteract any dimensional change during charging/discharging and stabilize the anode coating and the cathode coating on the current collectors.

Extending along each of the two opposing edge regions of the main surfaces is a conduit for conveying a heat transfer medium. Each of the conduits can have an inlet opening and an outlet opening for the heat transfer medium. If the conduits are connected to each other, one conduit can have an inlet opening and the other conduit can have an outlet opening.

The inlet openings are provided with a connection to a cooling/heating system, with it being possible for the connections to be molded directly on the outer shell.

Situated between the main surfaces of the outer shell is at least one heat-conducting layer made of unidirectional carbon fiber composite. Layers made of unidirectional carbon fiber composite are characterized by a high thermal conductivity in the fiber direction. The fibers are therefore aligned parallel to the cell contacts of a battery cell that is to be temperature-controlled in order to be able in this way to distribute and standardize the heat over the cell surface.

Through the parallel alignment of the fibers, it is possible to dissipate heat from the contact regions of the cell that are especially subject to thermal exposure, as a result of which the contact regions are relieved of heat, the heat is distributed more homogeneously over the total surface, and, overall, a cooling of the entire surface is achieved. Beyond this, the layer made of carbon fiber composite serves as a flexible support structure for further module components.

The layer made of carbon fiber composite can be formed from a unidirectional web of carbon fibers in a thermoset plastic or thermoplastic matrix.

Typically, the carbon fiber web can be built up of several layers of carbon fibers.

The thickness of the layers made of carbon fiber composite lies typically at 0.1 to 0.5 mm, preferably at 0.2 to 0.3 mm. For example, the layer made of carbon fiber composite can be formed from a unidirectional web of the carbon fibers in a silicone resin matrix.

If necessary, the flexibility of the carbon fiber composite layer can be increased for the case, for example, that unevenness of the surface of a battery cell is to be compensated for or in order to facilitate an adjustment of its shape to the shape of a battery cell. For this purpose, it is possible to blend a higher proportion of plasticizers into the bonding resin system of the layer made of carbon fiber composite, such as, for example, monofunctional siloxanes or epoxy oleic acid esters, which lend to the composite a higher flexibility.

In accordance with a special embodiment of the temperature control module, it is possible to provide at least one heat-conducting layer made of unidirectional carbon fiber composite on each inner side of the two main surfaces, with an intermediate layer being situated between the heat-conducting layers made of unidirectional carbon fiber composite and having one throughflow channel or a plurality of throughflow channels, via which the two conduits are connected to each other.

The intermediate layer can be produced from a polymeric material or from a metal. For example, a polymeric material such as that described previously for the outer shell can be used. It is especially advantageous if the material for the intermediate layer is thermally conductive. For example, a thermally conductive plastic or a metal with good thermal conductivity can be used.

On account of their very good thermal conductivity, especially suitable metals are silver (429), copper (380), or aluminum (236), in each case at 0° C. Based on the good price-to-performance ratio, copper is especially preferred.

Thermally conductive plastics, which are also referred to as thermally conductive plastic compounds, contain fillers, which improve their thermal conductivity. The fillers are usually introduced into the plastic in a large amount, so that reference is made to highly filled plastic compounds. Thermally conductive highly filled plastic compounds have a filler proportion of at least 50 wt. %.

Preferably, the thermally conductive plastic compounds have a thermal conductivity of at least 0.5 W/mK to 3 W/mK or even greater.

Fillers for thermally conductive plastic compounds are organic fillers, such as graphite, metallic fillers, such as, for example, copper or aluminum, and ceramic fillers, such as, for example, boron nitride and aluminum silicate. The weight proportion of fillers that improve the thermal conductivity, is, in general, at least 50 wt. %, preferably at least 65 wt. %, and in particular preferably up to 80 wt. % and, if necessary, more.

The thermally conductive plastic compounds can contain additional fillers besides the main filler component.

The polymeric material forms the matrix of the plastic compound. A large number of different types of polymer can be used, such as thermoplastic polymers, thermoplastic elastomers, elastomers, or thermoset plastics.

The throughflow channels, which are provided in the intermediate layer, connect the two conduits that extend along the two opposing edge regions of the module.

The throughflow channels can extend transversely over the intermediate layer from one edge region to the opposing edge region. They can be aligned parallel to each other, in particular parallel to the transverse axis. They can extend in the shape of a serpentine line, as a meandering line, or in another suitable shape.

It is possible to provide connecting channels, which connect two or more throughflow channels with one another.

The throughflow channels can be made as trough-shaped cuts on one side of the surface or on both sides of the surface of the intermediate layer, whereby the trough-shaped cuts do not completely transecting the intermediate layer.

If trough-shaped throughflow channels are provided on both sides of the surface, the throughflow channels of the one side of the surface can be arranged offset with respect to the throughflow channels of the other side of the surface.

The creation of the trough-shaped cuts in the surfaces of the intermediate layer can be made mechanically in a way that is known as such, namely, by engraving, milling, extrusion, etc.

For example, thermoplastic highly filled plastic compounds can be used for producing intermediate layers with trough-shaped throughflows.

In accordance with one embodiment, the throughflow channels can completely transect the intermediate layer, so that the intermediate layer is subdivided into individual sections. In the process, the opposing lateral surfaces of two adjacent sections form the lateral surfaces of the channel that is defined by the separation between the two sections.

As sections for the creation of an intermediate layer with throughflow channels that completely transect the intermediate layer, it is possible to use strips made from a good heat-conducting material, such as, for example, an above-mentioned material, which are arranged in the module one after the other and at a spacing from one another.

The covering of the free surfaces of the throughflow channels and thus of the upward end or downward end of a throughflow channel, is formed by adjoining layers, such as, for example, the inner side of the main surfaces of the outer shell or further, inner-lying layers of the module, such as, for example the layer or layers made of unidirectional carbon fiber composite.

The intermediate layer made of heat-conducting material contributes to the dissipation of heat coming from the cell to the heat transfer medium. In addition, the heat-conducting material ensures a good heat distribution over the height of the temperature control module.

The thickness of the intermediate layer lies, in general, at 0.1 to 0.5 mm, preferably 0.2 to 0.3 mm, and the width at 0.1 mm to 10 mm. The depth of the throughflow channels that completely transect the intermediate layer corresponds to the thickness of the intermediate layer. The depth of the trough-shaped throughflow channels as well as the width of the throughflow channels (transecting or trough-shaped) ensues depending on the thickness of the intermediate layer and the applied case. It is self-evident that the thickness and width of the intermediate layer or the depth of the throughflow channels can be varied as necessary.

This results in a layer construction for an especially preferred embodiment of the temperature module according to the invention in cross section as follows:
   outer shell (with its edge region with conduit)
   unidirectional carbon fiber composite layer
   intermediate layer, preferably made of good thermally conductive material, with throughflow channels
   unidirectional carbon fiber composite layer
   outer shell (with its edge region with conduit).

The outer shell can be cast around the further layers/coats by means of conventional casting methods, whereby, at the same time, the edge region with conduit can be co-cast.

The heat transfer medium can be liquid or gaseous. Based on the better heat transfers, a fluid medium is to be preferred.

In accordance with an advantageous embodiment, a gradient is created in the cooling capacity over the surface of the temperature control module. This means that, in regions with thermally greater exposure, a higher cooling capacity is correspondingly made possible than in regions with less thermal exposure. As already mentioned, the regions of the electrode contacts are subject to an especially high thermal exposure and heat evolution. The provision of a temperature gradient enables these regions to be effectively relieved.

Examples of measures and means for creating a temperature gradient are presented below. The presentation is not conclusive.

For the creation of a gradient, it is possible, for example, to provide a larger number of throughflow channels in the regions with a greater evolution of heat than in regions exposed to less heat.

Different heat-conducting materials can be used for the intermediate layer. In this case, in the region of the greatest evolution of heat, a material with very good thermal conductivity, such as, for example, copper, is placed. With increasing distance from this region with the greatest evolution of heat, it is then possible to utilize materials with decreasing thermal conductivity.

The throughflow channels can have different diameters, with the channels in the region with the greatest evolution of heat having a larger diameter and the diameter becoming smaller with increasing distance from this region with the greatest evolution of heat, so that, in the regions with the greatest evolution of heat, a greater cooling and, overall, a homogenization of the heat distribution over the surface of the battery cell can be achieved. In the case of conduits, the diameter can decrease in the direction of less thermal exposure.

In the throughflow channels and/or in the conduits, it is possible to utilize a porous material, the porosity of which decreases with increasing distance from the region with the greatest evolution of heat.

In the throughflow channels and/or in the conduits, it is possible to provide obstacles, the arrangement of which and/or the design of which is chosen in such a way that the throughflow speed of the heat transfer medium increases with increasing distance from the region with the greatest evolution of heat. For example, the number of obstacles can increase with increasing distance from the region with the greatest evolution of heat, as a result of which the flow speed is diminished.

It is self-evident that the means for the creation of a temperature gradient can be combined with one another.

An alternative or an additional possibility for the creation of a gradient in the cooling capacity is the provision of cooling fins, which project into the throughflow channel, on the inner wall of the throughflow channel. For gradation of the cooling capacity, the fins can be fixed in place on the inner wall with differently large spacings and/or in different numbers.

The cooling fins can be produced in various ways, such as, for example, by electrolytic deposition, etching out of a thin film, punching, etc.

Owing to the fins, the surface around which circulation occurs is increased, as a result of which the homogenization of the temperature distribution in the heat transfer medium can be improved. At the same time, the fins can also serve for regulation of the flow resistance of the heat transfer medium.

Particularly for the application in conduits, measures such as decreasing the diameter, providing a porous material, and providing obstacles, whereby the porosity and the number of obstacles diminishes in the direction of regions with less heat exposure, are suitable.

In accordance with one embodiment, it is possible by using the temperature control module to cool simultaneously and directly the oppositely poled terminal contacts of a battery cell. For this purpose, a cooling tab made of a heat-conducting material is drawn out of the temperature control module and can be joined directly to the cell contacts.

In an advantageous manner, for the formation of one cooling tab or a plurality of cooling tabs, it is possible to draw out a corresponding molded part from a terminal section of the intermediate layer made of heat-conducting material.

The cooling tabs serves as a heat sink that make possible a direct cooling of the terminal contacts, which, in general, represents the most effective method of cell cooling. Within the temperature control module, the cooling tabs transfer the heat directly to the heat transfer medium via contact with the carbon fiber composite layer and the heat transfer medium.

In order to prevent a short circuit between the two oppositely poled terminal contacts when cooling tabs are provided, the carbon fiber composite layer has to be electrically insulated with respect to the cell contacts. For electrical separation, it is possible to provide in the carbon fiber composite layer an insulating interruption made of an electrically insulating material.

By use of an electrically insulating interruption, the carbon fiber composite layer is divided into two parts that are electrically insulated from each other.

The position of the electrically insulating interruption is governed by the position of the electrical contacts of the battery cell: that is, whether 1) a contact is situated at opposing sides in each instance or 2) two contacts are situated adjacent to each other on the same side of the battery cell.

In the first case, the electrically insulating interruption in the carbon fiber composite layers is oriented transversely centered with respect to the connecting axis between the electrical contacts and, in the second case, it is oriented parallel centered with respect to the electrical contacts. In both cases, the carbon fiber composite layers are divided into parts that are electrically insulated from one another. As a rule, the carbon fiber composite layer is divided into two halves.

The electrically insulating interruption can be made, for example, by inserting a separating strip made of an electrically insulating material into the carbon fiber composite layers, which divides the carbon fiber composite layers into two parts.

Because the carbon fiber composite layers are made up of a series of fiber layers, it is possible for this purpose, for example, to shorten the fibers of each fiber layer to an adequate length along the dividing surface and to fill the empty space thereby formed with an insulating material.

The electrically insulating material for the interruption can be a glass-fiber composite or another suitable electrically insulating material.

The thickness of the electrical interruption is oriented to the thickness of the carbon fiber composite layer and can lie at 0.1 to 0.5 mm, preferably at 0.2 to 0.3 mm.

For the operation, the conduits of the temperature control module are connected to an overriding cooling-heating system, by means of which the heat transfer medium can be temperature-controlled in accordance with the operating and ambient conditions.

The invention will be explained in detail below on the basis of exemplary embodiments with reference to the figures. Illustrated in FIGS. 1 to 6 are embodiments of the temperature control module according to the invention for application in flat cells, such as, for example, prismatic cells or pouch cells. FIG. 7 shows a form of application for cylindrical cells.

Figure 2:
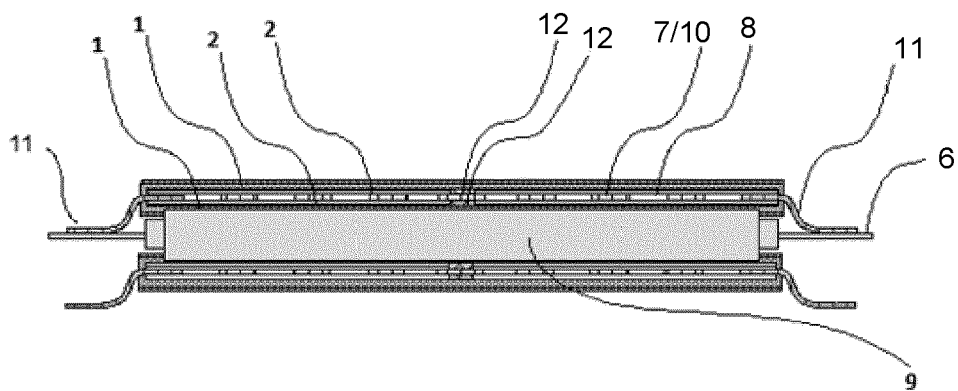
Figure 3:
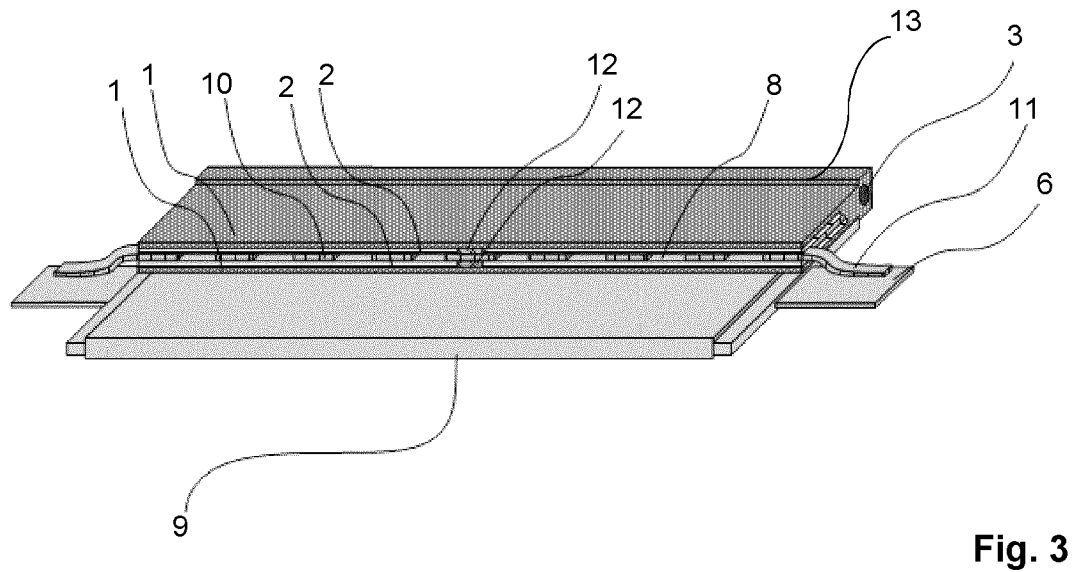
Figure 4:
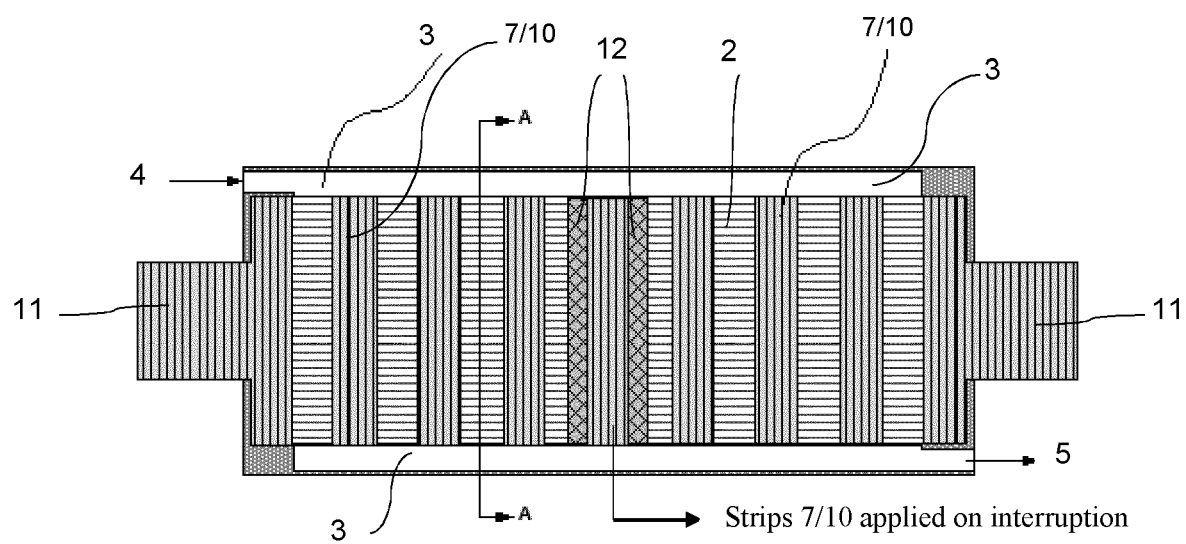
Figure 5:
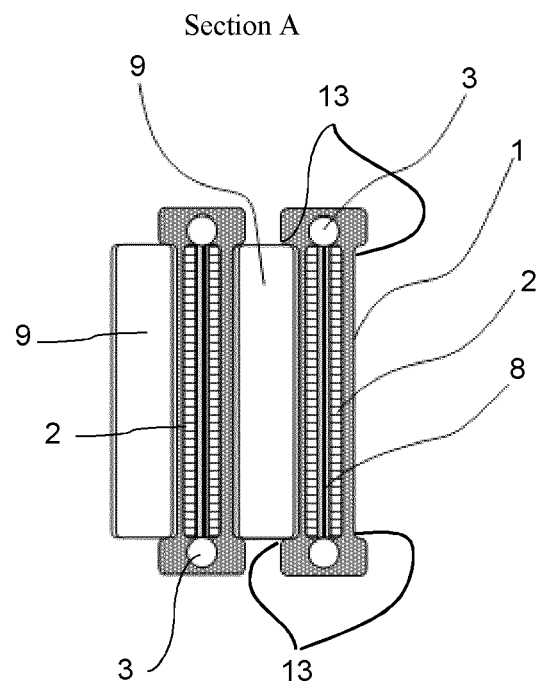
Figure 6:
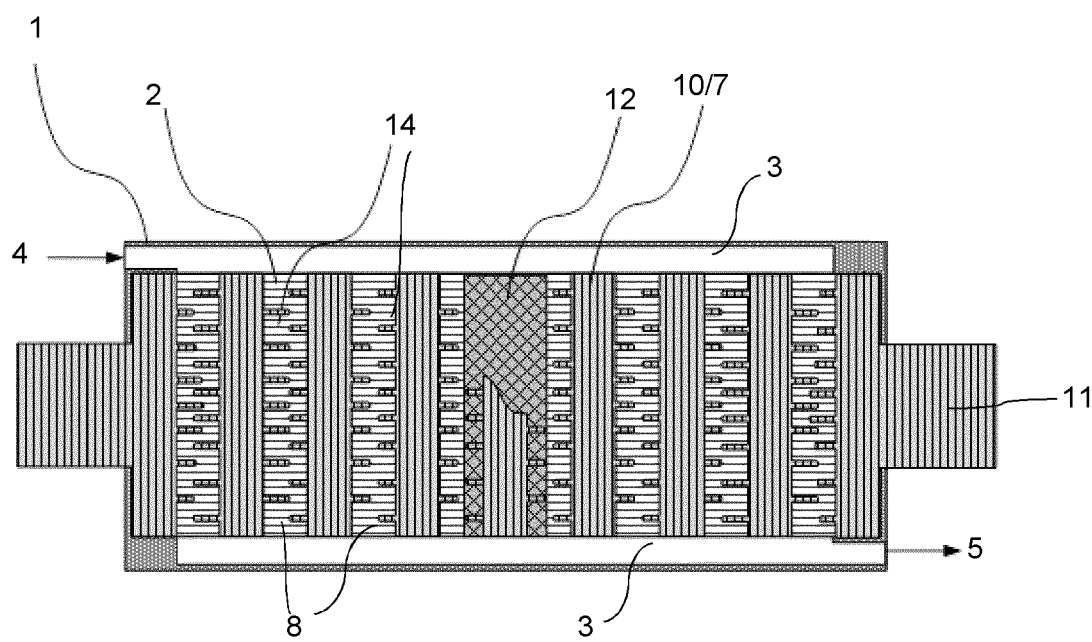
Figure 7:
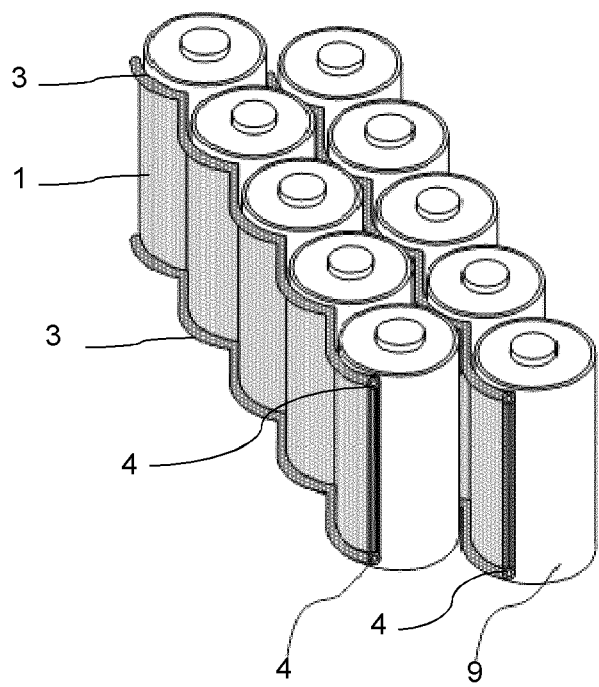

Shown are:

FIG. 1: an embodiment of a temperature control module according to the invention with an essentially plate-shaped rectangular basic shape having two opposing main surfaces with two long sides and two short sides;

FIG. 2: the view of a further embodiment of the temperature control module according to the invention in a longitudinal section cut, with two temperature control modules resting on both sides against a flat battery cell;

FIG. 3: a view of a longitudinal section cut through a temperature control module in accordance with FIG. 2, arranged on a surface of a pouch cell;

FIG. 4: a plan view of a section cut parallel to the surface of the temperature control module in accordance with FIG. 3;

FIG. 5: the view of section A cut perpendicular to the surface according to FIG. 4;

FIG. 6: the plan view onto a section cut parallel to the surface of a temperature control module in accordance with FIGS. 2 to 5 having additional cooling fins;

FIG. 7: a cell pack composed of cylindrical cells with a temperature control module according to the invention that is adapted to the cylindrical shape, and FIGS. 8 to 12: various possibilities for gradation of the dissipation of heat in a temperature control module according to the invention.

Shown in FIG. 1 is a plan view of a section cut parallel to the surface of a temperature control module with a plate-shaped rectangular basic shape. The temperature control module in accordance with FIG. 1 is designed for use with flat battery cells whose the electrode contacts 6 are situated on the same side of the battery and, in the figure, project over the left short side of the module.

Visible are the edge regions of the outer shell 1 along the long sides and the conduits 3 that are situated on the edge regions and extend between the two short sides along the long sides. Arranged between the edge regions is at least one layer made of unidirectional carbon fiber composite 2. The carbon fibers extend in parallel from the short side with the electrode contacts 6 along the long sides to the opposing short side (right in the figure).

At the ends on the short sides, each conduit 3 has a respective inlet opening 4 and an outlet opening 5 for the heat transfer medium. The inlet openings 4 lie on the same short side, that is, on the short side on which, in the applied case, the electrode contacts 6 are situated, and the outlet openings 5 each lie on the opposing short side.

The flow course of the heat transfer medium in the conduits 3 is indicated by the orientation of the arrow extending in the conduits 3. The high heat load generated in the electrode contact regions can be dissipated efficiently by the fresh heat transfer medium entering there and by means of the parallel oriented carbon fibers towards the opposite cooler end, so that the heat load can be distributed over the entire cell surface essentially uniformly.

Shown in FIG. 2 is a longitudinal section cut through an arrangement of two temperature control modules, which rest against the main surfaces of a pouch cell 9. In this embodiment, the module has two layers made of unidirectional carbon fiber composite 2, between which an intermediate layer 7 with throughflow channels 8 is situated.

One throughflow channel, a plurality of throughflow channels, or all throughflow channels 8 can be connected to the conduits 3, which extend in the edge regions of the main surfaces along the long sides.

Preferably, the intermediate layer 7 is composed of a thermally conductive material, such as a metal like, for example, copper. However, it can also be produced from any other suitable material, such as, for example, a thermally conductive plastic compound.

As already mentioned, the throughflow channels 8 completely transect the intermediate layer 7, as a result of which separate sections 10 of the intermediate layer 7 are obtained and the separation between adjacent sections 10 defines a throughflow channel 8.

Preferably situated on the two short sides (ends) of a temperature control module is a section 10 made of a thermally conductive material, from which a tab is drawn out as a cooling tab 11, which is in contact with the electrode contact 6 of the battery cell 9 (here, for example, a pouch cell). These cooling tabs 11 serve as a heat sink for direct cooling of the electrode contact 6.

In order to prevent that the cooling tabs 11 within the temperature control module short-circuit the two oppositely poled electrode contacts 6 via contact with the carbon fiber composite layer 2 and the heat transfer medium, the carbon fiber composite layers 2 can be insulated with respect to the electrode contacts 6 by means of a corresponding interruption. For this purpose, it is possible in the carbon fiber composite layers 2 to provide an electrically insulating interruption 12, which extends transversely over the entire width of the carbon fiber composite layer 2. The electrically insulating material for the interruption 12 can be a glass-fiber composite. The electrically insulating interruption 12 can extend in the form a strip between the carbon fiber composite layers 2 and a section 10. It can also be an integral component of the carbon fiber composite layer 2.

As can be seen from FIGS. 2 and 5, it is possible on the outer side in the main surfaces of the temperature control modules, which, in the applied case, rest against the battery cell 9, to provide a depression or trough 13, which corresponds to the length and width dimensions of the cell body 9 and can fix the cell body 9 in place or can support it in a cell stack (FIG. 5).

Shown in FIG. 3 is a longitudinal section cut through a temperature control module, which is arranged on a pouch cell 9. Visible are the preferably thermally conductive sections 10, which are arranged at a spacing from one another, whereby, in each instance, a cooling tab 11, made of the terminal sections 10 on the short sides of the temperature control module, is drawn out for direct cooling of the contacts 6. An electrical interruption 12 is made correspondingly in the carbon fiber composite layer 2 in order to prevent a short circuit of the two oppositely poled electrode contacts 6.

On the long side of the temperature control module, lying in the back in FIG. 3, the edge region with the conduit 3 can be seen.

A plan view of a section cut made parallel through the intermediate layer 7 with throughflow channels 8 or sections 10 of the temperature control module according to the invention in accordance with FIG. 3 is illustrated in FIG. 4. Clearly seen are the conduits 3, which extend along the two long sides of the temperature control module. One conduit 3 (above in the figure) has a fluid inlet opening 4 and the opposite-lying conduit 3 has a fluid outlet opening 5, with the inlet 4 and the outlet 5 being arranged on opposing short sides of the module. The conduits 3 are closed at the ends opposite to the inlet and outlet openings 4, 5.

The intermediate layer 7 can be formed from striplike, preferably thermally conductive sections 10, which are arranged horizontally transversely over the module surface from the conduit 3 with the inlet 4 to the conduit 3 with the outlet 5. The distances between adjacent sections 10 define the throughflow channels 8 for the heat transfer medium.

The terminal, thermally conductive sections 10 have cooling tabs 11, which project out of the module and act as a heat sink for the electrical contacts 6 of a battery cell 9. An electrical interruption 12, which, in this case, is arranged on both sides of the central section 10, is situated correspondingly in the module in order to electrically insulate the oppositely placed electrode contacts 6 from each other.

Illustrated in FIG. 5 is the view of the section A cut perpendicular to the surface in accordance with FIG. 4.

Shown is a battery arrangement with two battery cells 9, which are in contact with two temperature control modules. Here, one battery cell 9 is arranged between the two temperature control modules. The second battery cell 9 rests with its main surface against the free second main surface of the left temperature control module. Clearly seen are the edge regions of the outer shell 1 with the conduits 3 as well as the recess/depression 13 extending between the edge regions on the outer side of the outer shell 1, which serves for holding the battery cells 9. Situated on the inner side of the outer shell 1 are, in each instance, a layer made of carbon fiber composite 2, the layers extending along the main surfaces of the temperature control modules and between the two opposing edge regions of the outer shell 1. The middle layer is a section cut through a throughflow channel 8 of the intermediate layer 7.

It is self-evident that the battery arrangement can be designed as a battery stack or as a battery pack with a desired number of battery cells 9 with control modules arranged in between, whereby the free main surfaces of the terminal battery cells can rest against a temperature control module.

FIG. 6 shows an embodiment of the temperature control module, as shown in FIGS. 2 and 5, as a section cut parallel to the surface of the temperature control module. In this embodiment, there are, in each case, a number of cooling fins 14 on the lateral surfaces of the striplike sections 10 of the intermediate layer 7, which project into the throughflow channels 8. The cooling fins 14 bring about an increase in the surface area of the striplike sections 10 and thus a better heat transfer. As shown here, the fins 14 can be arranged offset with respect to one another on two opposing lateral surfaces of adjacent thermally conductive striplike sections 10 and can extend into the region of a gap between two adjacent fins 14 on the opposing lateral surface of a striplike section 10.

It is self-evident that the number and arrangement of the cooling fins 14 can vary as need be.

For electrical insulation of the opposing short sides with the cooling tabs 11, that is, of the position of the oppositely poled electrodes 6 of a battery cell 9 in the applied case, an electrical interruption 12 is provided. The electrical interruption 12 extends transversely over the entire width between the conduits 3 of the module.

FIGS. 1 to 6 show the embodiment and the use of the temperature control module according to the invention for flat battery cells, such as, for example, pouch cells. However, the temperature control module according to the invention can also be utilized for the temperature control of battery cells with a shape different from a flat shape, such as, for example, for cylindrical cells, as illustrated in FIG. 7.

The functionalities are hereby identical.

If need be, it is possible for this application to increase the flexibility of the module, so that the shape of the module can better adapt to the curved surface of cylindrical battery cells. For example, for this purpose, it is possible to add a higher proportion of plasticizers to the bonding resin system of the layer made of carbon fiber composite 2, thereby lending the composite a higher flexibility. Examples are monofunctional siloxanes or epoxidized oleic acid esters. In principle, however, it is also possible to press the layer made of carbon fiber composite 2 by means of a corresponding wave-shaped pressing die in a press under pressure and temperature to obtain the desired wave shape.

As already described previously, a gradation in the dissipation of heat may be desired in order to compensate for a temperature gradient in the battery cell 9, for example. In regions with especially high heat load, it is hereby possible to provide for a greater dissipation of heat than in regions with less heat load. Examples of means for effecting a gradation of the dissipation of heat are illustrated schematically in FIGS. 8 to 12.

FIGS. 8 to 12 each show a plan view of a section cut parallel to the surface of a temperature control module according to the invention. In the embodiment shown here, in contrast to the embodiment shown in FIGS. 2 and 7, the cooling tabs 11 are situated on the same short side of the module. Alternatively to the modules shown in FIGS. 2 to 7, the conduits 3 each have a fluid inlet opening 4 on the one short side and a fluid outlet opening 5 on the oppositely lying short side, whereby, in both conduits 3, the inlets 4 and outlets 5 are each situated on the same short side of the module.

The fluid inlet openings 4 are situated on the short side with the cooling tabs 11 and thus on the side on which the electrode contacts 6 of a battery cell 9 are situated in the applied case when the temperature control module is fixed in place in a battery cell 9. This is appropriate, because, in the region of the electrode contacts 6, the greatest heat load is generated.

As already discussed in connection with FIG. 1, the conduction of heat can be effected by providing a layer made of unidirectional carbon fiber composite 2, whereby the carbon fibers extend from the side with the electrode contacts 6 to the opposing short side of the module. Accordingly, the heat can be dissipated from the thermally most exposed region with the electrode contacts 6 towards thermally less exposed regions.

Figure 8:
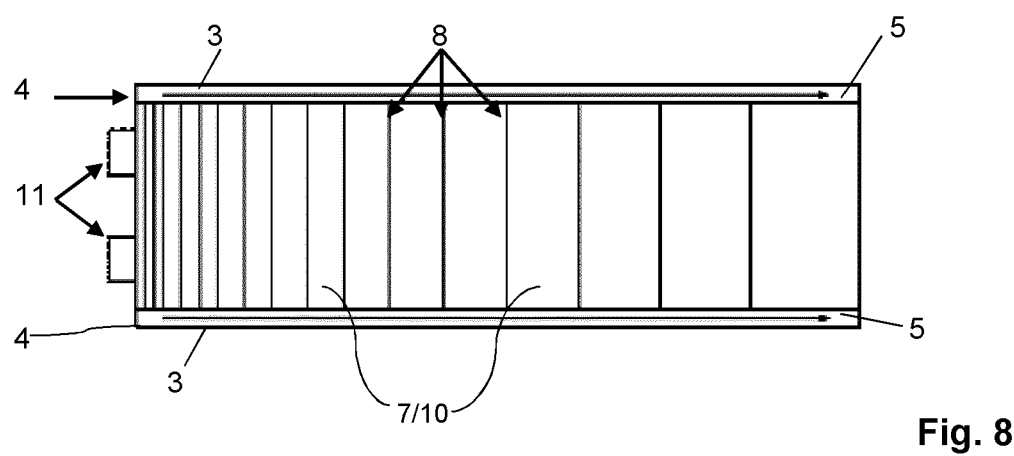

In accordance with a further possibility for the dissipation of heat and for the homogenization of heat over the cell surface, the number of throughflow channels 8 can be varied over the length extension of the module, as shown in FIG. 8. Thus, the number of throughflow channels 8 in the region of the greatest thermal exposure (in FIG. 8 on the left side) can be greater than in regions with less thermal exposure.

Figure 9:
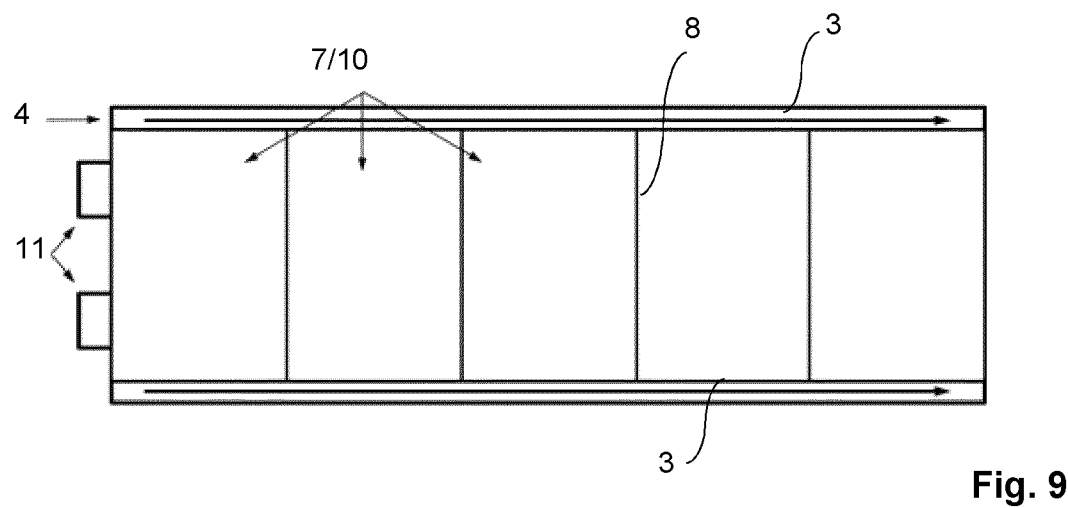

In the case of thermally conductive strips 10, which define the throughflow channels 8, it is possible to utilize materials with different thermal conductivity (see FIG. 9). Accordingly, in the regions with high heat load, it is possible to use materials with higher thermal conductivity than in regions with low heat load. For example, a very good conductor of heat, such as, for example, copper, can be placed at the point of greatest heat exposure, that is, in FIG. 9, on the side with the electrode contacts, which is covered here by the cooling tabs 11. With increasing distance from this region, it is possible to use for the thermally conductive strips 10 materials with decreasing thermal conductivity, such as, for example aluminum, and so forth.

Figure 10:
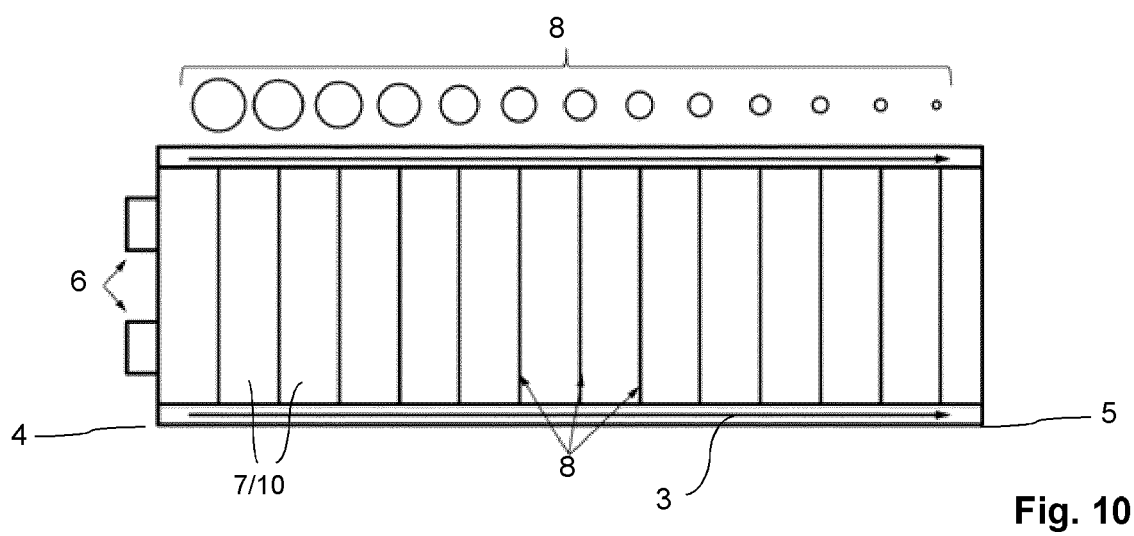

A gradient for the dissipation of heat can be realized by way of different diameters of the throughflow channels 8, as illustrated in FIG. 10. The diameter of the throughflow channels 8 hereby becomes smaller with increasing distance from the region with the greatest thermal exposure. Accordingly, the cooling capacity in the region with throughflow channels 8 with large/larger diameter is higher and decreases with the diameter so as to achieve a greater cooling in the thermally more exposed region and to obtain a homogenization of the heat distribution or heat load over the length extension of the module.

Highlighted in FIG. 10 via the series of circles of decreasing diameter over the temperature control module is the decrease in the diameter of the throughflow channels 8 from the side with the electrode contacts 6 to the oppositely lying side.

In the conduits 3 and/or the throughflow channels 8, it is possible to provide a porous material 13, the porosity of which decreases with increasing distance from the thermally most exposed regions.

Figure 11:
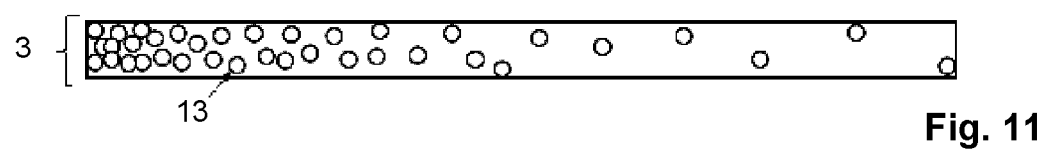

An example with a longitudinal section cut through a conduit 3 with porous material 15 is shown in FIG. 11. The region with the highest porosity 15 is situated in FIG. 11 on the left side. Here, this is the region with the greatest thermal exposure. In the direction towards the opposing right short side, the porosity 15 decreases successively.

If the porous material 15 is provided in the throughflow channels 8, it is appropriate for the porosity 15 in throughflow channels in the thermally more strongly exposed regions to decrease in the direction of thermally less exposed regions.

Figure 12:
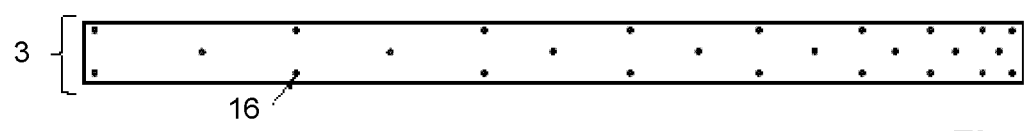

As shown in FIG. 12, in the channels, in particular in the conduits 3, obstacles 16 for regulation of the throughflow speed of the heat transfer fluid can be provided. As illustrated in FIG. 12, the number of obstacles 16 and thus the obstruction of the flow passing through the region with the greatest evolution of heat (here on the left end) is the least and increases in the direction towards the region with the least evolution of heat (right in the figure).

If the obstacles are situated in throughflow channels 8, the obstruction of the flow, that is, the number of obstacles 16, in the throughflow channels 8 should be greater in thermally more exposed regions than in thermally less exposed regions.

A regulation of the throughflow speed of the heat transfer medium can also occur through the selection of the shape and/or size of the obstacle.

A decrease or a gradation of the heat transfer can also be achieved by a decrease in the number of cooling fins 14.

It is self-evident that combination of the measures presented above is also possible for regulation of the of the temperature gradient over the temperature control module. For example, the measures for the regulation of the throughflow, as shown in FIGS. 11 and 12, can be combined with one or more further measures, such as the provision of a layer made of a unidirectional carbon fiber composite (FIG. 1), the provision of different spacings of the throughflow channels (FIG. 10), the provision of materials for the thermally conductive strips 6 with different thermal conductivity (FIG. 9), and/or a decrease in the diameter of the throughflow channels 7 in accordance with FIG. 10.

For batteries with electrode contacts 6 on opposing sides, such as, for example, in FIGS. 2 to 6, the heat-dissipating measures, as described in the embodiments in accordance with FIGS. 8 to 12, are aligned in an appropriate manner towards the middle of the module.

In accordance with the invention, a versatile temperature control module for the cooling and heating of rechargeable battery cells, in particular lithium ion battery cells, is provided, which can ensure a safe and secure operation in the ideal temperature range between 15° C. and 35° C., a uniform distribution of the heat load over the entire battery surface, and an efficient dissipation of the heat produced in thermally especially exposed regions, such as the region of the electrode contacts, and can make possible a gradated dissipation of heat with especially high dissipation performance in thermally especially exposed regions. In addition, the temperature control module can be designed for different types and shapes of batteries.

REFERENCE SYMBOLS 1 outer shell
2 layer made of unidirectional carbon fiber composite
3 conduit
4 inlet opening for heat transfer medium
5 outlet opening for heat transfer medium
6 electrode contacts
7 intermediate layer
8 throughflow channels
9 battery cells
10 strips, in particular thermally conductive strips (sections)
11 cooling tab
12 electrically insulating interruption
13 recess/depression in the outer shell 1
14 cooling fins
15 porous material
16 obstacles for regulation of the throughflow speed

The invention claimed is:

1. A temperature control module for the heating or cooling of battery cells,
    wherein the temperature control module comprises an outer shell (1) made of a polymeric material and the outer shell (1) has two opposing main surfaces, which are joined to each other along their edges, wherein the outer shell (1) surrounds the inner-lying components of the temperature control module,
    wherein, in the interior of the temperature control module, at least one heat-conducting layer made of unidirectional carbon fiber composite (2) is provided and, on each of two opposing edge regions of the main surfaces, a conduit (3) extends for conveying a heat transfer medium,
    wherein the at least one heat-conducting layer made of unidirectional carbon fiber composite (2) extends between the conduits (3) over the module surface.

2. The temperature control module according to claim 1,
    wherein, on the inner side of each of the two main surfaces of the outer shell (1) a layer made of unidirectional carbon fiber composite (2) is provided and, between the layers made of unidirectional carbon fiber composite (2), an intermediate layer (7) is situated, which has one throughflow channel or a plurality of throughflow channels (8), via which the conduits (3) are connected.

3. The temperature control module according to claim 2, wherein the intermediate layer (7) is made from a heat-conducting material.

4. The temperature control module according to claim 2, wherein the heat-conducting material for the intermediate layer (7) is a metal.

5. The temperature control module according to claim 2, wherein the heat-conducting material for the intermediate layer (7) is a thermally conductive plastic compound.

6. The temperature control module according to claim 5, wherein the thermally conductive plastic compound has a thermal conductivity of at least 0.5 W/mK.

7. The temperature control module according to claim 2, wherein the one throughflow channel or the plurality of throughflow channels (8) subdivides or subdivide the intermediate layer (7) into individual sections (10) that are separated from one another.

8. The temperature control module according to claim 1, wherein the one throughflow channel or the plurality of throughflow channels (8) is or are trough-shaped cuts in the intermediate layer.

9. The temperature control module according claim 2, wherein cooling fins (14) are placed on the side walls of the throughflow channels (8).

10. The temperature control module according to claim 1, wherein, on the outer side of the two main surfaces, a depression (13) is provided for holding a battery cell.

11. The temperature control module according to claim 2, wherein the throughflow channels (8) extend along the transverse axis of the temperature control module parallel to one another between the conduits (3).

12. The temperature control module according to claim 1, wherein means for gradation of the dissipation of heat are provided.

13. The temperature control module according to claim 12, wherein the means are chosen from
a) a decrease in the number of the throughflow channels (8) along the temperature gradient,
b) a decrease in the thermal conductivity of the materials for the sections/strips (7/10) along the temperature gradient,
c) a decrease in the diameter of the throughflow channels (8) and/or conduits (3) along the temperature gradient,
d) placement of a porous material (13) in the conduits (3) and/or throughflow channels (8), wherein the porosity along the temperature gradient decreases,
e) insertion of obstacles (16) in the conduits (3) and/or throughflow channels (8), wherein the number of obstacles (16) increases along the temperature gradient, and
f) combination two or more of the above-mentioned means a) to e).

14. The temperature control module according to claim 1, wherein, at least on a front side of the temperature control module, a cooling tab (11) is provided for the direct cooling of the electrode contacts (6) of an adjoining battery cell (9).

15. The temperature control module according to claim 1, wherein the polymeric material for the outer shell (1) is an elastomer.

* * * * *